(12) United States Patent
Garcia et al.

(10) Patent No.: US 8,046,676 B2
(45) Date of Patent: *Oct. 25, 2011

(54) AUTOMATIC VIEW CREATION IN A SHEET SET MANAGER FOR A GRAPHICS PROGRAM

(75) Inventors: Jose Madeira De Freitas Garcia, San Francisco, CA (US); John Giraud Ford, III, Mill Valley, CA (US); Jay Allan Behr, San Francisco, CA (US); Chaffee Khanh-Truong Vo-Vu, San Rafael, CA (US); Stephen Joseph Mighetto, Berkeley, CA (US); Karen Elaine Mason, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 2208 days.

This patent is subject to a terminal disclaimer.

(21) Appl. No.: 10/800,585

(22) Filed: Mar. 15, 2004

(65) Prior Publication Data

US 2005/0204277 A1 Sep. 15, 2005

(51) Int. Cl.
*G06F 17/00* (2006.01)

(52) U.S. Cl. ...................................... 715/211

(58) Field of Classification Search .................... 715/211
See application file for complete search history.

(56) References Cited

U.S. PATENT DOCUMENTS

| | | | | |
|---|---|---|---|---|
| 5,973,695 A * | 10/1999 | Walsh et al. | ................... | 715/854 |
| 6,339,439 B1 * | 1/2002 | Takahashi et al. | ............ | 715/853 |
| 6,466,953 B1 * | 10/2002 | Bonney et al. | ................ | 715/502 |
| 6,983,064 B2 * | 1/2006 | Song | ............................. | 382/131 |
| 7,047,180 B1 * | 5/2006 | Mathews et al. | ................ | 703/27 |
| 2002/0111928 A1 * | 8/2002 | Haddad | ............................ | 707/1 |
| 2003/0043177 A1 * | 3/2003 | Kawai | ........................... | 345/700 |
| 2004/0177089 A1 * | 9/2004 | Love et al. | ................. | 707/103 R |
| 2005/0202382 A1 * | 9/2005 | Rahn et al. | .................... | 434/262 |

* cited by examiner

*Primary Examiner* — William L Bashore
*Assistant Examiner* — Henry Orr
(74) *Attorney, Agent, or Firm* — Gates & Cooper LLP

(57) ABSTRACT

A Sheet Set Manager for a computer-implemented graphics program allows drawings to be organized logically as a Sheet Set comprising a collection of Sheets and Subsets of Sheets, wherein each Sheet comprises a drawing, layout or view. The Sheet Set Manager is a graphical user interface for displaying, accessing and managing the Sheet Sets, Subsets and Sheets, as well as editing components of the Sheet Sets, Subsets and Sheets.

33 Claims, 13 Drawing Sheets

AUTOMATIC VIEW CREATION IN A SHEET SET MANAGER FOR A GRAPHICS PROGRAM

CROSS-REFERENCE TO RELATED APPLICATIONS

This application is related to the following co-pending and commonly-assigned Utility Applications:

Ser. No. 10/800,877, entitled "USER INTERFACE ELEMENTS OF A SHEET SET MANAGER FOR A GRAPHICS PROGRAM," filed on Mar. 15, 2004, by Jose Madeira de Freitas Garcia, John Giraud Ford, III, jay Allan Behr, Qun Lu, Thomas Allen Stoeckel, Jr., and Karen Elaine Mason, Ser. No. 10/800,384, entitled "TRANSMITTAL AND ARCHIVE TOOL IN A SHEET SET MANAGER FOR A GRAPHICS PROGRAM," filed on Mar. 15, 2004, by Jose Madeira de Freitas Garcia, Karen Elaine Mason, Qun Lu and Stefanos Michail Makris, Ser. No. 10/800,786, entitled "SHEET SET PUBLISHING IN A SHEET SET MANAGER FOR A GRAPHICS PROGRAM," filed on Mar. 15, 2004, by Jose Madeira de Freitas Garcia, John Giraud Ford, III, Matthew Eugene Denko and Christopher Miller, Ser. No. 10/800,475, entitled "SHEET SET FIELDS OF A SHEET SET MANAGER FOR A GRAPHICS PROGRAM," filed on Mar. 15, 2004, by Jose Madeira de Freitas Garcia, John Giraud Ford, III, Jay Allan Behr, Davis Cooper Augustine and Karen Elaine Mason, Ser. No. 10/800,477, entitled "SHEET SET MANAGER FOR A GRAPHICS PROGRAM," filed on Mar. 15, 2004, by Jose Madeira de Freitas Garcia, John Giraud Ford, III, Jay Allan Behr, Jules Brenner, Randy Allan Kintzley, Stefanos Michail Makris, Qun Lu, Chaffee Khanh-Truong Vo-Vu and Christopher Miller, all of which applications are incorporated by reference herein.

BACKGROUND OF THE INVENTION

1. Field of the Invention

The present invention relates generally to graphics programs, and in particular, to a sheet set manager for a graphics program.

2. Description of the Related Art

For drafting and design professionals, drawing sets are used to communicate design intent. In most cases, drafting and design professionals will present or deliver their design presentations and deliverables to their clients many times during a project. These design presentations and deliverables are typically an organized set of drawing sheets that systematically specify a design. Each sheet in the set comprises a composition of model data and annotative data that is used to express a specific area, part, or view of the design.

In most graphics programs, the highest level of organization provided is a file. Historically, in the absence of automated tools, many users have adopted standards for manually organizing their files, through file contents and file naming conventions. One such standard is the National CAD Standards (NCS), which dictates a consistent method that firms can use to structure their files to work like physical sets of drawing sheets. However, while it is currently possible to manually organize a set of drawing sheets using files, the result does not fit well into users' actual workflow.

Accordingly, what is needed are automated tools for organizing sets of drawing sheets. Specifically, there is a need in the art for a set of tools for use with computer-implemented graphics programs that assists users to create, deploy, manage, and publish sets of drawing sheets.

SUMMARY OF THE INVENTION

A Sheet Set Manager for a computer-implemented graphics program allows drawings to be organized logically as a Sheet Set comprising a collection of Sheets and Subsets of Sheets, wherein each Sheet comprises a drawing, layout or view. The Sheets Sets contain Sheets that are typically stored in one or more different Files, wherein the organization of these Files, and the organization of the Sheets within the Files, is managed by the Sheet Set Manager. The Sheet Set Manager is the primary interface utilized for displaying, accessing and managing the Sheet Sets, Subsets and Sheets, as well as editing components of the Sheet Sets, Subsets and Sheets.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1 OVERVIEW

A Sheet Set Manager for a computer-implemented graphics program allows drawings to be organized logically as a Sheet Set comprising a collection of Sheets and Subsets of Sheets, wherein each Sheet comprises a drawing, layout or view. The Sheet Set Manager is a graphical user interface for displaying, accessing and managing the Sheet Sets, Subsets and Sheets, as well as editing components of the Sheet Sets, Subsets and Sheets.

2 HARDWARE AND SOFTWARE ENVIRONMENT

Figure 1:
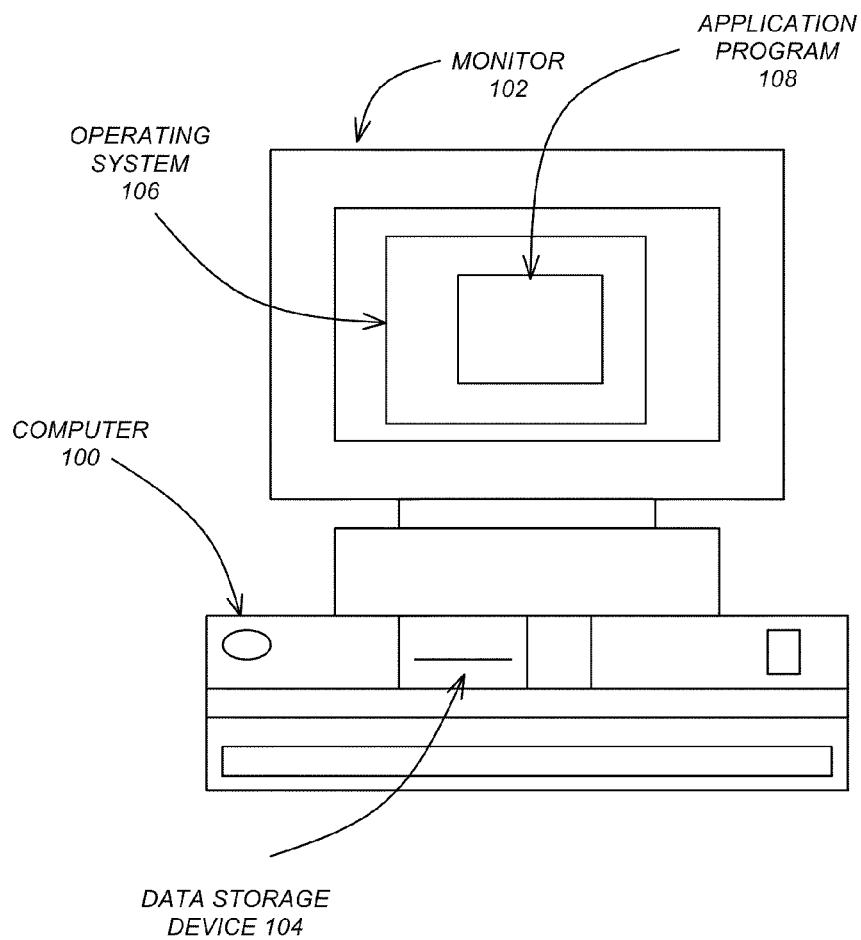
FIG. 1 is an exemplary hardware and software environment used to implement one or more embodiments of the invention.

FIG. 1 is an exemplary hardware and software environment used to implement one or more embodiments of the invention. The preferred embodiment of the present invention may be implemented using a computer 100, which generally includes, inter alia, a monitor 102 or other display device, one or more data storage devices 104, and any number of other devices. Those skilled in the art will recognize that any combination of the above components, or any number of different components, peripherals, and other devices, may be used with the computer 100.

The computer 100 operates under the control of an operating system 106, which is represented by a window displayed on the monitor 102. The operating system 106, in turn, controls the operation of one or more application programs 108, which is also represented by a window displayed on the monitor 102. The preferred embodiment of the present invention comprises a Sheet Set Manager that is implemented in the application program 108, although the Sheet Set Manager may be implemented in the operating system 108.

Generally, both the operating system 106 and application program 108 comprise instructions and/or data that are embodied in or readable from a device, media, carrier, or signal, e.g., one or more fixed and/or removable data storage devices 104 connected directly or indirectly to the computer 100, one or more remote devices coupled to the computer 100 via a data communications device, etc. Moreover, these instructions and/or data, when read, executed, and/or interpreted by the computer 100, cause the computer 100 to perform the logic necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass instructions and/or data accessible from any computer-readable device, media, carrier or signal Of course, those skilled in the art will recognize many modifications may be made to this configuration without departing from the scope of the present invention. Specifically, those skilled in the art will recognize that the exemplary environment illustrated in FIG. 1 is not intended to limit the present invention. Indeed, those skilled in the art will recognize that other alternative environments may be used without departing from the scope of the present invention.

3 APPLICATION PROGRAM

Figure 2:
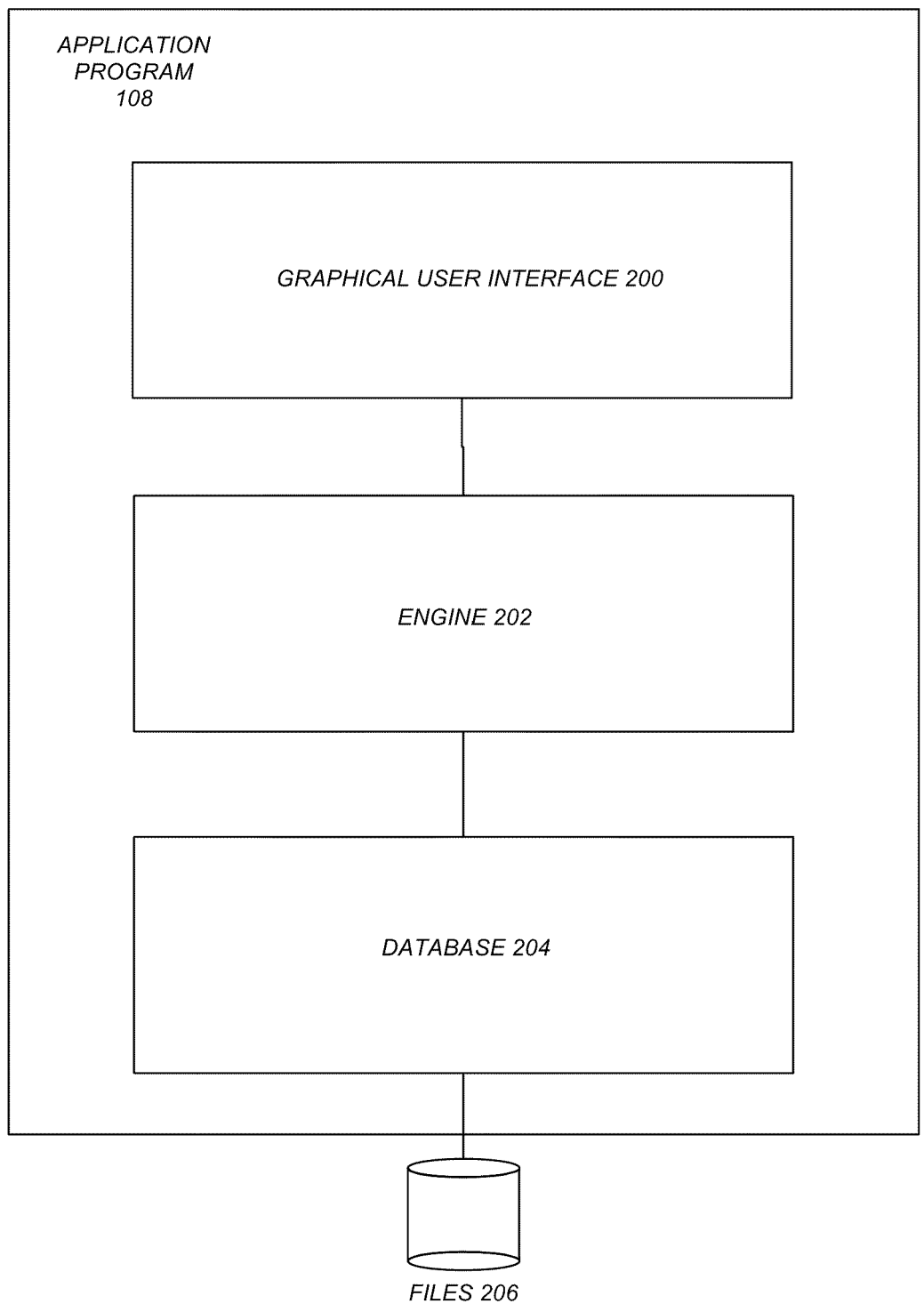
FIG. 2 is a block diagram that illustrates components of the application program, according to a preferred embodiment of the present invention.

FIG. 2 is a block diagram that illustrates the components of the application program 108 in accordance with a preferred embodiment of the present invention. Preferably, the application program 108 comprises a graphics or drafting program, such as the AUTOCAD product sold by AUTODESK, INC, the assignee of the present invention.

In this embodiment, the application program 108 includes a Graphical User Interface 200, an Engine 202, and a DataBase 204 for storing data in one or more Files 206. Those skilled in the art will recognize that the application program 108 may include other or different components while still embodying the present invention.

The Graphical User Interface 200 displays information to the operator and provides the functionality for the operator's interaction with the application program 108. The Engine 202 processes the data stored in the Files 206 and delivers the results to the Graphical User Interface 200 for display on the monitor 102. The DataBase 204 stores data generated by the application program 108, such as graphical, textual or other data, in the Files 206.

Preferably, the Database 204 is comprised of two types of data: (1) three-dimensional (3D) data known as the "3D world space"; and (2) two-dimensional (2D) data, known as drawings, layouts or views.

With regard to the 3D data, an object or collection of objects in the 3D world space is often referred to as a "model." Consequently, the 3D world space in which a model resides is referred to as a model space.

With regard to the 2D data, drawings and layouts are created in a 2D space, and thus are displayed in that 2D space. However, views store 2D data derived from the 3D data. For example, a user may desire to view the model in the model space from various perspectives (e.g., a top view, right and left side views, bottom view, etc.). To view the model in the model space, a user defines and creates one or more views that include one or more 2D viewports. A viewport is a bounded area that displays some portion of the model space of the model. Multiple viewports may be used to provide different views of the model. Views are defined and stored in the Database 204.

4 OPERATION OF THE SHEET SET MANAGER

The preferred embodiment of the present invention introduces a Sheet Set Manager into the application program 108. The Sheet Set Manager allows drawings to be organized logically as a Sheet Set comprising a collection of Sheets and Subsets of Sheets, wherein each Sheet comprises a drawing, layout or view. The Sheet Set Manager is the primary interface utilized for displaying, accessing and managing the Sheet Sets, Subsets and Sheets, as well as editing components of the Sheet Sets, Subsets and Sheets.

The Sheets Sets contain Sheets that are typically stored in one or more different Files 206. The organization of these Files 206, and the organization of the Sheets in the Files 206, is managed by the Sheet Set Manager. The Sheet Set Manager will locate the necessary Files 206, present current status information about the Sheets contained therein, and open the necessary Files 206 for displaying, editing, publishing, transmitting, or archiving the Sheets.

The Sheet Set Manager also lets users, especially those working in teams and sharing Sheets, to work with the Sheets that are familiar to them, without having to concern themselves with the underlying arrangement of Files 206 used to store the Sheets. Using the Sheet Set Manager, users can perform functions in a quick and easy way.

The Sheet Set Manager includes a number of tools that deliver various functionality. These tools include:

Sheet Sets—the ability to view and act on a Sheet Set, without having to identify the Files 206 used to store the Sheets.

Subsets—the ability to view and act on a Subset of Sheets, without having to identify the Files 206 used to store the Sheets.

Sheets—the ability to view and act on Sheets, without having to identify the Files 206 used to store the Sheets.

The benefits of the Sheet Set Manager are extensive, but amongst the most important are:

List of Sheets in one place.

Management of Sheets (e.g., sorting, deleting, creating) in one place.

Publish all Sheets with minimal clicks (e.g., one-click publishing).

Perform tasks across a Sheet Set (e.g., one-click functions).

5 USER INTERFACE ELEMENTS

Figure 3A:
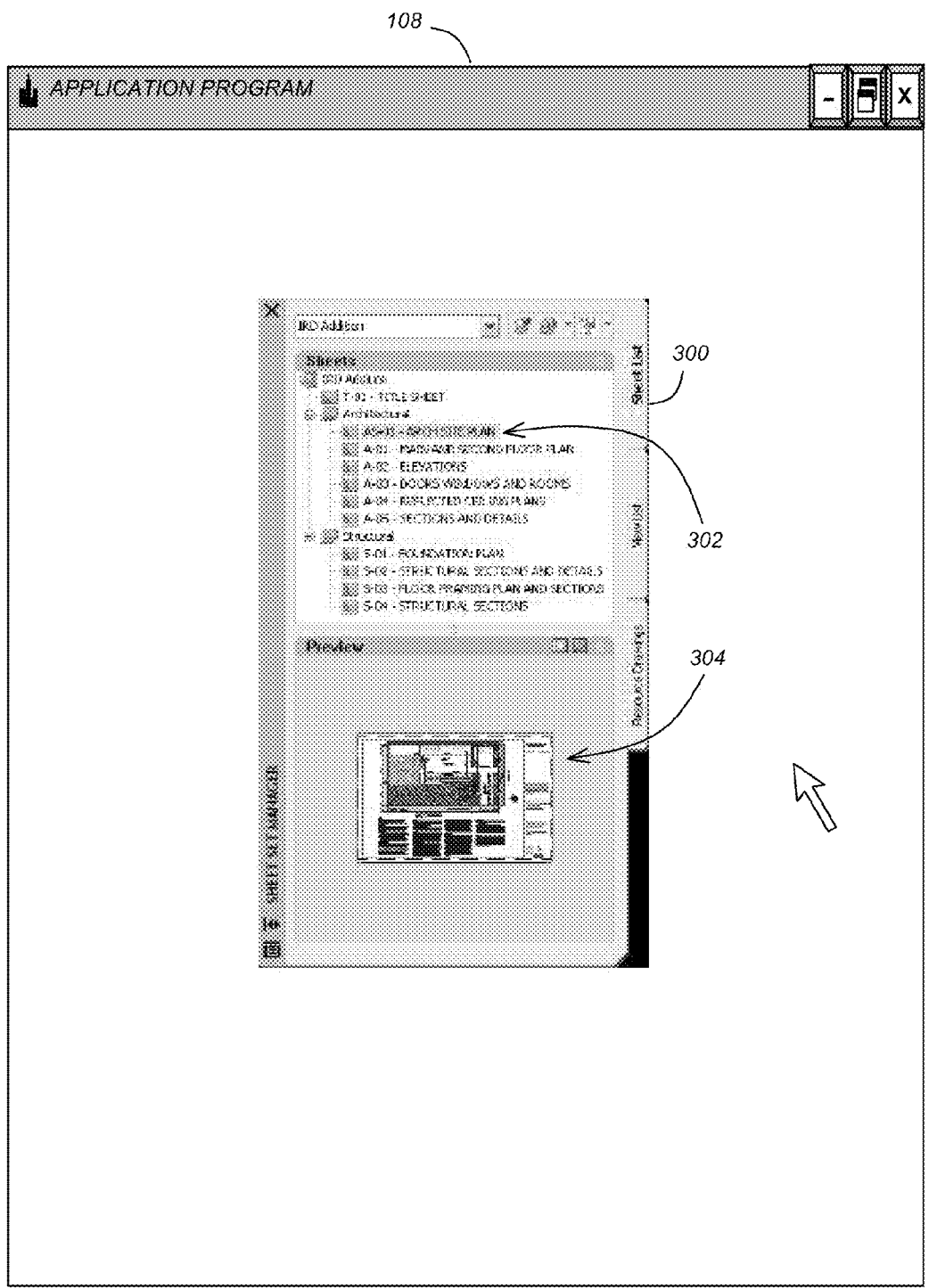
FIGS. 3A, 3B, 3C and 3D are illustrations of an application program window, according to a preferred embodiment of the present invention.
Figure 3B:
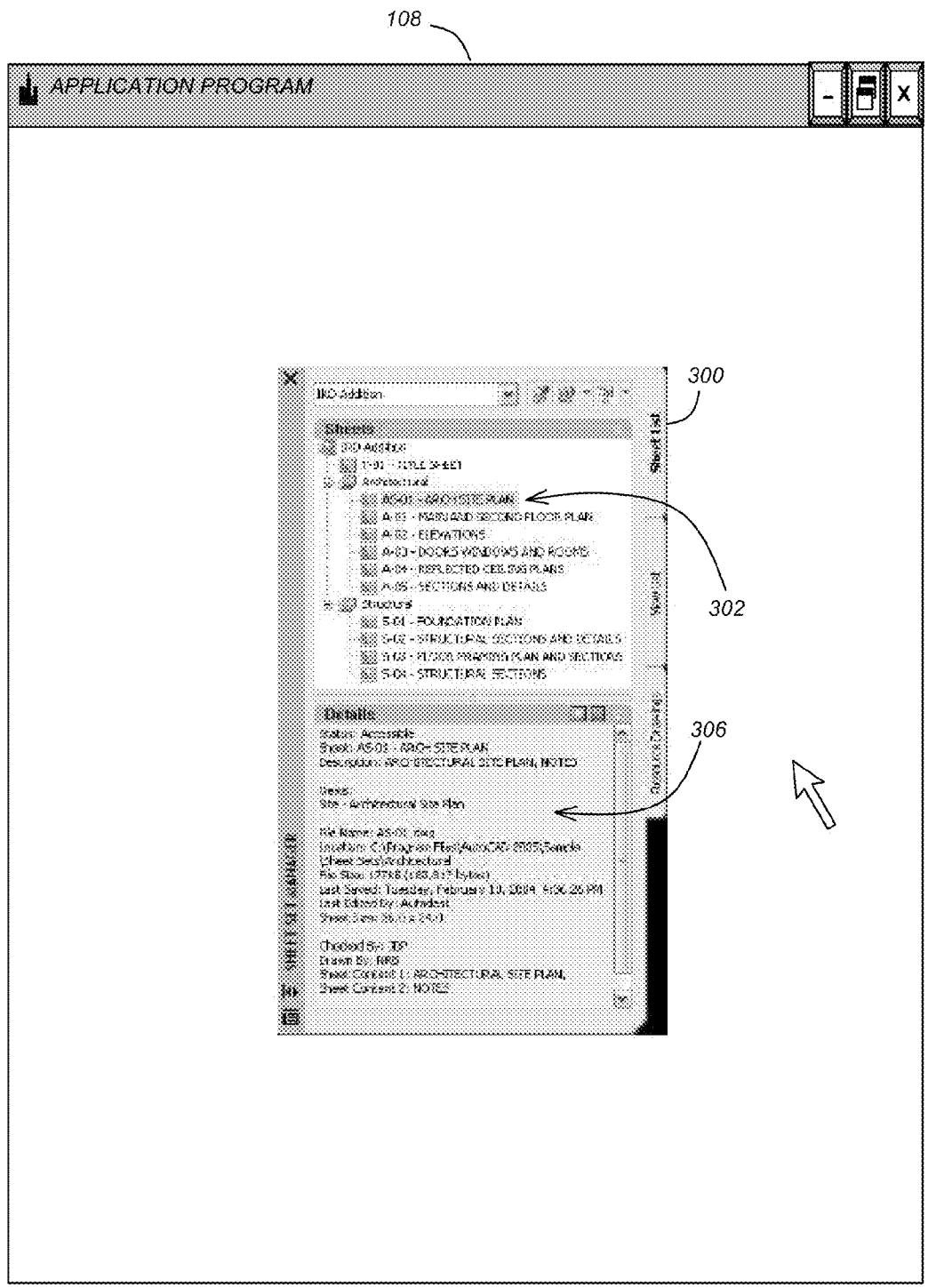

FIGS. 3A, 3B, 3C and 3D are illustrations of the application program 108 window representing the Sheet Set Manager according to a preferred embodiment of the present invention. Specifically, FIGS. 3A, 3B, 3C and 3D illustrate the main window 300 of the Sheet Set Manager, wherein the main window 300 presents a logical structure for Sheet Sets in a visual form The main window 300 includes three tabs:

"Sheet List" tab (FIGS. 3A and 3B)—The main purpose of the Sheet List tab is to provide the user a "page-by-page" summary of the Sheet Set, as well as Subsets and Sheets contained therein. In addition, FIG. 3A shows a thumbnail preview image for a selected Sheet, while FIG. 3B shows a list of details for a selected Sheet.

"View List" tab (FIG. 3C)—The View List tab is designed to provide a method for managing the views of the Sheet Set.

"Resource Drawings" tab (FIG. 3D)—The Resource Drawings tab allows the user easy access to the Files 206 underlying the Sheet Set.

The window 300 is especially useful as a Sheet Set grows in complexity. Various types of icons, along with a tree structure, are used to display the Sheet Set, Subsets, Sheets, Views and Files 206 in an easily decipherable format to the user.

For example, in each of FIGS. 3A, 3B, 3C and 3D, the Sheet Set Manager displays a hierarchical tree representation comprised of zero or more nodes. The tree includes a root node, while the other nodes illustrate the relationships between various elements being displayed. Each node in the tree includes either a plus sign, a minus sign, or no sign, wherein the plus sign indicates that additional levels of the tree are present but are not being displayed, the minus sign indicates that the additional levels of the tree are being displayed, and the lack of any sign indicates that the lowest level of the tree is being displayed. Consequently, there can be any number of levels within the tree.

In FIG. 3A, the tree represents a Sheet Set that contains Subsets and Sheets within the window 300. The Sheet Set is the topmost or root node, labeled as "IRD Addition," which may also be selected from the drop-down list at the top of the window 300. Underneath the root node, two Subsets are shown, labeled as "Architectural" and "Structural," wherein a number of Sheets are shown within each Subset. Selection 302, which is grayed-out, identifies a mouse-selected node, i.e., a Sheet labeled as "AS-01-ARCH SITE PLAN," wherein a thumbnail preview image of the selected Sheet is displayed in a preview pane 304 at the bottom portion of the window 300.

In FIG. 3B, a details pane 306 is shown in place of the preview pane 304 of FIG. 3A. Properties of the selected Sheet are displayed in a details pane 306 at the bottom portion of the window 300.

Figure 3C:
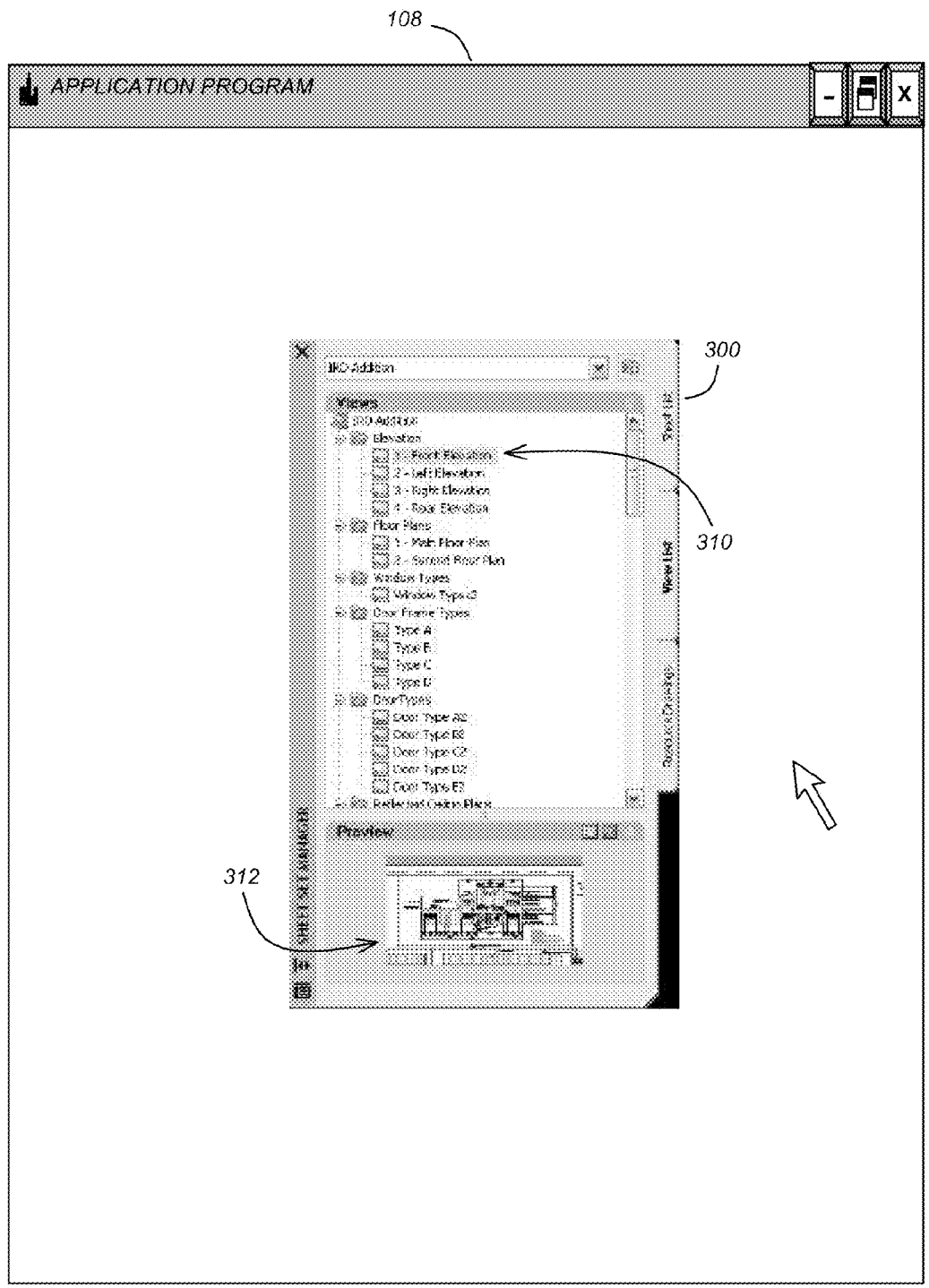

In FIG. 3C, the tree represents Views of a Sheet Set. The Sheet Set is the topmost or root node, labeled as "IRD Addition," which may also be selected from the drop-down list at the top of the window 300. Underneath the root node, five groupings of Views are shown, labeled as "Elevation," "Floor Plans," "Window Types," "Door Frame Types," and "Door Types," wherein a number of Views are shown within each grouping. Selection 310, which is grayed-out, identifies a mouse-selected node, i.e., a View labeled as "1—Front Elevation," wherein a thumbnail preview image of the selected View is displayed in a preview pane 312 at the bottom portion of the window 300.

Figure 3D:
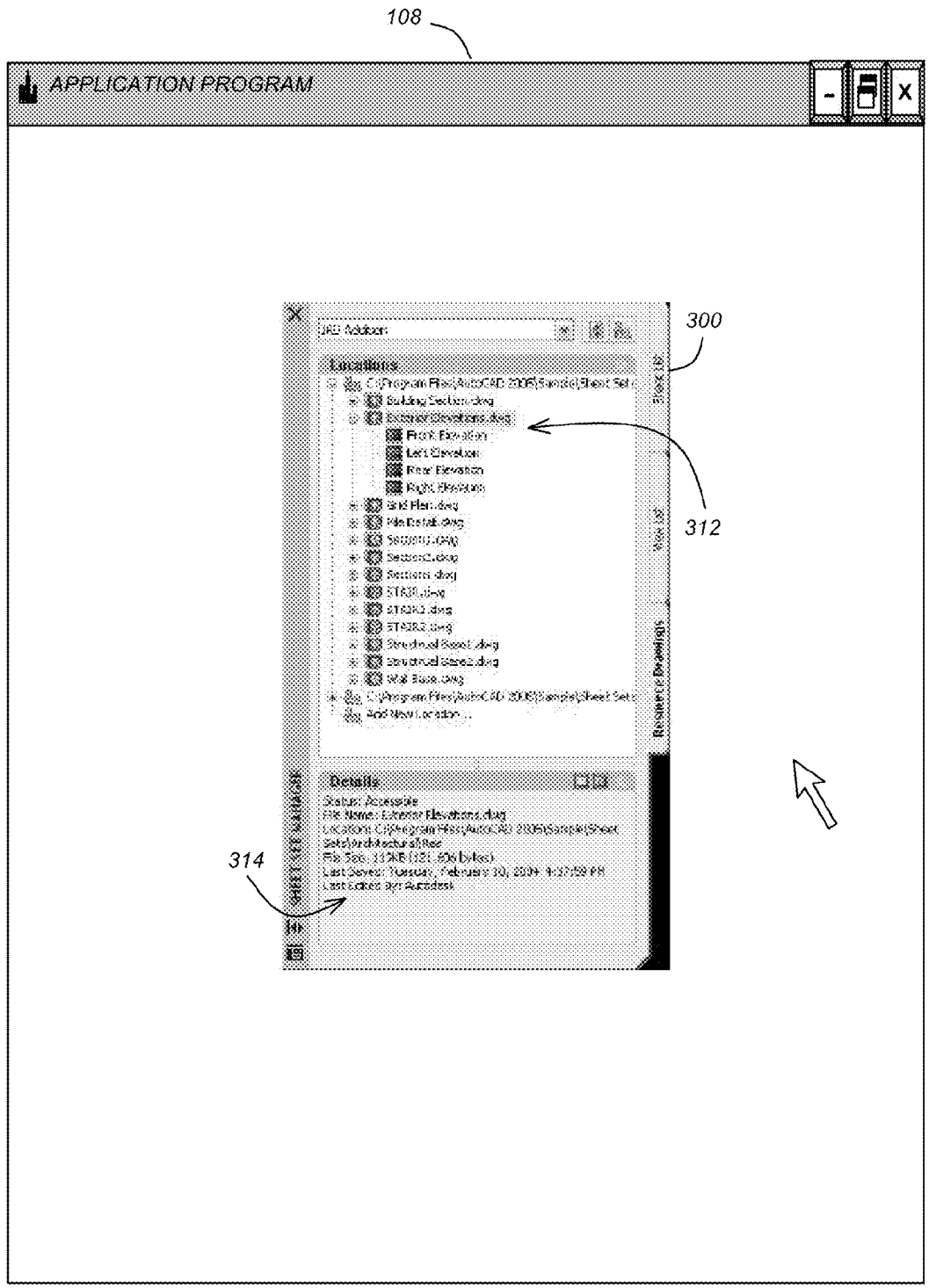

In FIG. 3D, the tree represents Resource Drawings of a Sheet Set. Two file directories are the topmost or root nodes, both labeled as "C:\Program Files\AutoCAD 2005\Sample\Sheet Sets," wherein the Sheet Set containing these Resource Drawings may be selected from the drop-down list at the top of the window 300. Underneath the first root node, thirteen (13) Files 206 are shown, each labeled with a ".dwg" extension, wherein a number of Views are shown within the second File 206 in the list of Files 206. Selection 312, which is grayed-out, identifies a mouse-selected node, i.e., a File 206 labeled as "Exterior Elevations-.dwg," wherein a list of properties of the selected File 206 are displayed in a details pane 314 at the bottom portion of the window 300.

6 SHEET SET FIELDS

All Sheets contain some amount of text to help clarify the design contained therein. The text may appear as notes, labels, call outs, numbered and alphabetic lists, and in title blocks or tables of various kinds.

Sometimes the content of the text is expected to remain static and never changes after it is entered into the Sheet. Often, the text represents information about the design and must be changed as the design evolves. The information may be reflective of the Sheet itself (filename, Sheet name, Sheet number save or print date, names of views, etc.), or it may reflect the properties of specific objects in the Sheet (perimeter or area of an area, location of geometry, data attached to objects, etc.). Moreover, the text may be placed relative to the object it describes, other times it appears as an item in a table or designated portion of the sheet like a title block.

The prior art allows users to enter static text through a variety of commands including text, multi-line text, and attributes. However, when properties of the document change or as objects in the drawing change, users must manually go back and update the text with new values. This is labor intensive and can result in errors if the text is not updated in a timely manner, or if it is overlooked.

The Sheet Set Manager, on the other hand, lets users place callouts directly onto the Sheets, and automatically create fields that display the appropriate numbers or labels. Moreover, the Sheet Set Manager lets users see their work, and access individual drawing elements, without having to know the specific Files 206 that hold that information, and without having to know where in the Files 206 the drawing element is located.

When placing callout references from the Sheet Set Manager, users have access to the following important functions:
- Users can place callout references directly from the Sheet Set Manager onto their Sheets.
- Users can place these callout references even before the final label or number for the referred Sheet and/or view has been fully defined. A placeholder field will wait to display the appropriate value after it is available.
- The Sheet Set Manager will automatically update the callout reference label or number after the location number or label for the Sheet or View has been changed.
- Users can create these collections of callout reference blocks in advance, use them throughout a Sheet Set, and use them as a foundation for future Sheet Sets.

Users benefit greatly when text that reflects the changing aspects of the design or document could be updated automatically or semi-automatically, instead of requiring the user to manually reedit the text.

7 VIEWS

In the present invention, Views become much more prominent and take on a more important role in the workflow when creating Sheets and viewing Sheets. A single Sheet may often display different portions of a design in different ways, so different areas of the Sheet may be labeled with a View name. Since an entire design cannot be shown on a single Sheet, there are often callout symbols shown in the Sheet that indicate how to display more information. Standard conventions are often used for categorizing Views and controlling what View labels and callouts should look like.

The Views feature of the Sheet Set Manager includes both View and Viewport enhancements. Together, enhancements to Views and Viewports work together to enable the following high level usability goals:
- Enable a simple way to compose content on a Sheet in a Sheet Set.
- Provide the user with a more powerful method for accessing a model space.
- Organize and keep track of smaller areas of a layout through Views of Sheets.
- Access more flexible control of View boundaries after creation.
- Provide more preview information about contents before a user opens a File 206.

There are a number of enhancements to Views and Viewports which work together or individually to enable the usability improvements listed above.

Views in the present invention include the following enhancements:
- They can be tracked in a Sheet Set.
- They carry a Name.
- Paper Space named Views are specific to a single Layout.
- They carry layer state information.
- They can have their boundaries re-defined after creation.
- They can be tied to a Viewport.
- They are represented by thumbnail preview images.

Viewports in the present invention include the following enhancements:
- They can be maximized.
- They can be created from a named View (model space view).

8 AUTOMATIC VIEW CREATION

The Sheet Set Manager provides a function for Automatic View Creation. The Sheet Set Manager presents users with a list of the Views defined in the Sheet Set. Placing a View onto a Sheet is a simple drag-and-drop operation. This simple user interaction performs the following actions:
- Create an external reference (xRef) if necessary, to the File 206 containing the View.
- Create the Viewport in the paper space displaying the precise geometric region defined in the View.
- Manage the layer states in the new Viewport to ensure that the correct information is presented.
- Create a named View, and place it in the tree displayed in the Sheet Set Manager.
- Place a label block into the Sheet, with fields to display the appropriate label information for that View, which will update automatically if their values change.
- In addition to automatically placing a View onto a Sheet, the automatic view creation function also gives the user the opportunity to adjust the scale of the View during the operation itself.

9 SHEET SET PUBLISHING

Previously, a Publish command could be used for outputting multiple drawings to electronic or paper format. Users would enter Files 206 into a dialog box, and then specify the proper ordering of individual drawings, either in the dialog box or through a manual sorting process of their printed output.

With the Sheet Set Manager, the application program 108 allow users to perform a Publish command directly from a predefined Sheet Set using a single operation. The most important functions are:
- Publish an entire Sheet Set or a portion of a Sheet Set to electronic or paper format.
- "One-click" publishing of a selection of Sheets (single click of tool-bar button outputs sheets using default settings).
- Ability to apply publishing overrides to a Sheet Set, instantly changing a variety of properties such as:
    output device,
    paper size,
    drawing orientation,
    reverse order output,
    etc.
- Ability to send different elements of a Sheet Set to different output devices.
- Direct access to features that allow users to perform additional operations, such as applying sorts, importing page setups from other Sheets, etc.
- Ability to include a plot stamp with each published Sheet, automating the inclusion of time stamps, drawing name, user name of individual who last modified file, etc.

10 TRANSMITTAL AND ARCHIVE

A Transmittal and Archive function is available for packaging, communication and storage of multiple Files 206 and all associated and linked Files 206 as a cohesive unit. It enables users to share data accurately in a multi-user environment quickly and without errors. The function acts upon a Sheet Set as a whole, using in one-step functionality.

The most important functions are:
- Collect all Files 206 related to the Sheet Sets, Subsets and Sheets.
- Automatically extract and bundle all referenced files (Xrefs).

Automatically bundle all support files necessary to view and edit the Sheets (includes fonts, linetypes, other related files from diverse applications such as Excel, etc.).

Compressing the Sheet Sets, Subsets and Sheets, so that they can be saved, emailed, or otherwise transmitted.

Ability to save setups for fast re-generation of the package when data has changed.

The key aspects of this feature are:

Finding the complete set of Files 206 that store the Sheet Sets, Subsets and Sheets.

Finding the complete set of library files required to continue working on the Sheet Set.

Packaging all of these into a single File 206.

11 Logic of the Preferred Embodiment

Flowcharts which illustrate the logic of the application program 108 according to the preferred embodiment of the present invention are shown in FIGS. 4-10. Those skilled in the art will recognize that this logic is provided for illustrative purposes only and that different logic may be used to accomplish the same results.

Figure 4:
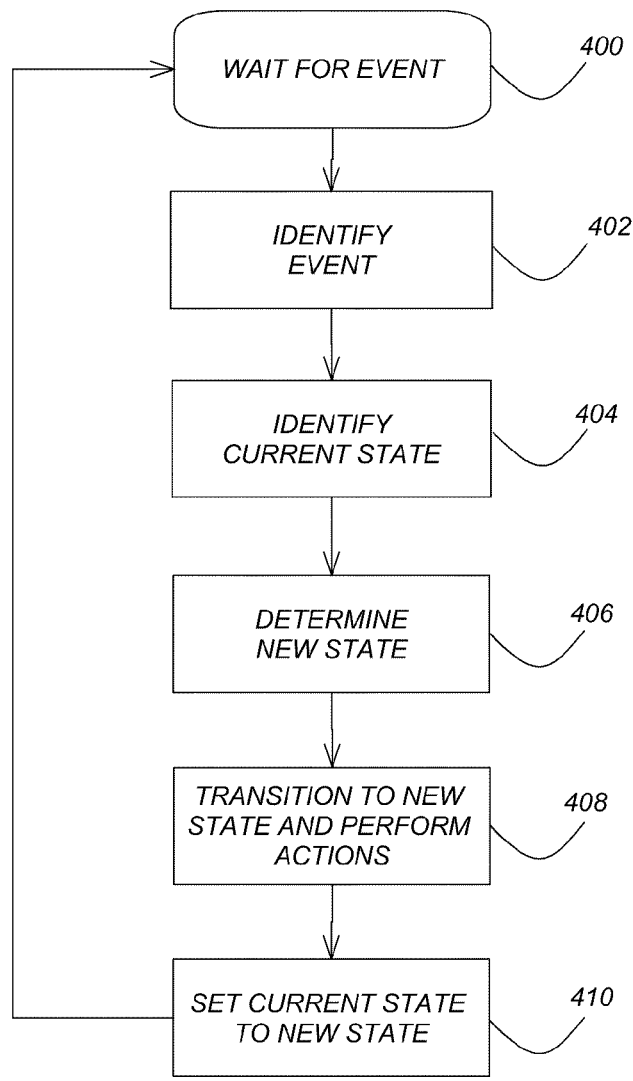
FIG. 4 is a flowchart that illustrates the general logic of a message or event-driven application program performing the steps of the preferred embodiment of the present invention.

FIG. 4 is a flowchart that illustrates the general logic of a message or event-driven application program 108 performing the steps of the preferred embodiment of the present invention. In such an application program 108, operations are performed when transitions are made, based upon the receipt of messages or events, from present or current states to new states.

Generally, the flowchart begins by waiting at block 400 for an event (e.g., a mouse button click). It should be appreciated that during this time, other operating system tasks, e.g., file, memory, and video tasks, etc., may also be carried out. When an event occurs, control passes to block 402 to identify the event. Based upon the event, as well as the current state of the application program 108 determined in block 404, a new state is determined in block 406. In block 408, the logic transitions to the new state and performs any actions required for the transition. In block 410, the current state is set to the previously determined new state, and control returns to block 412 to wait for more input events.

The specific operations that are performed by block 408 when transitioning between states will vary depending upon the current state and the event. The various operations required to implement the application program 108 represent particular events handled by the logic. However, it should be appreciated that these operations represent merely a subset of all of the events handled by the application program 108.

11.1 Sheet Set Manager

Figure 5:
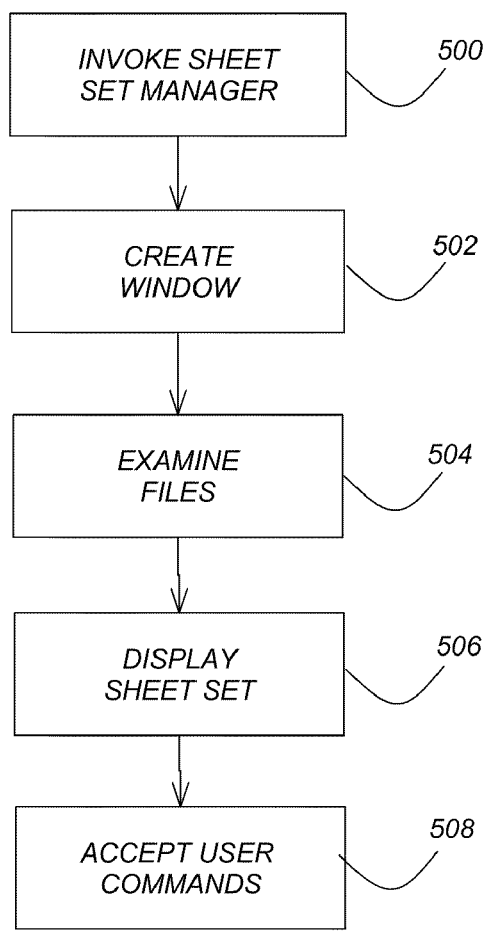
FIG. 5 is a flowchart that illustrates the general logic that is performed in the application program when the Sheet Set Manager is invoked, according to the preferred embodiment of the present invention.

FIG. 5 is a flowchart that illustrates the general logic that is performed in the application program 108 when the Sheet Set Manager is invoked, according to the preferred embodiment of the present invention.

Block 500 represents the Sheet Set Manager function of the application program 108, being invoked or performed in response to a user command. As noted above, the Sheet Set Manager manages a one or more Sheet Sets, wherein each of the Sheet Sets comprises a collection of zero or more Sheets and Subsets of the Sheets, each of the Sheets comprises a drawing, layout or view.

Block 502 represents the Sheet Set Manager creating a window 300 in the Graphical User Interface 200. The window 300 includes a "Sheet List" tab that provides a user with a "page-by-page" summary of the Sheet Set, the Subsets, and the Sheets contained therein, a "View List" tab that provides a method for managing views of the Sheets in the Sheet Set, wherein the Views are defined regions within the Sheets, and a "Resource Drawings" tab that provides a method for accessing files underlying the Sheets in the Sheet Set.

Block 504 represents the Sheet Set Manager examining the Files 206 for information on Sheet Sets. The Sheet Sets, Subsets and Sheets are stored in one or more different Files 206. Consequently, an organization of the Files 206, and an organization of the Sheet Sets, Subsets and Sheets in the Files 206, is managed by the Sheet Set Manager. Specifically, the Sheet Set Manager locates the Files 206 containing the Sheet Sets, Subsets and Sheets, presents current status information about the Sheet Sets, Subsets and Sheets contained therein, and opens the Files 206 for displaying, editing, publishing, transmitting, or archiving the Sheet Sets, Subsets and Sheets. Moreover, the Sheet Set Manager provides an ability to view and act on the Sheet Set, without having to identify the files used to store the Sheets.

Block 506 represents the Sheet Set Manager displaying a Sheet Set in the main portion of the window 300. Because the Sheets and Subsets are organized logically in the Sheet Set, this includes displaying a logical structure for the Sheet Set, Subsets and Sheets on the computer. The logical structure comprises a hierarchical representation of the Sheet Set with a node representing the Sheet Set at a topmost level of the representation, one or more nodes representing the Subsets and Sheets at a lower level of the representation, and one or more nodes representing the Sheets within the Subsets at a lowest level of the representation. In addition, the Sheet Set Manager allows viewing of the Sheet Set as an organized collection of graphical thumbnail previews or properties.

Block 508 represents the application program 108 accepting input from the user instructing the Sheet Set Manager to perform various commands. In this Block, the Sheet Set Manager is used for displaying, accessing and managing the Sheet Sets, Subsets and Sheets, as well as editing the Sheet Sets, Subsets and Sheets.

11.2 Sheet Set Fields

Figure 6:
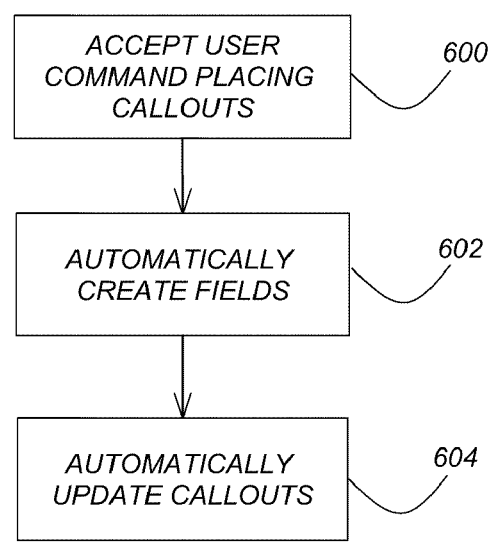
FIG. 6 is a flowchart that illustrates the general logic that is performed in the application program when the Sheet Set Manager is used to place callouts, according to the preferred embodiment of the present invention.

FIG. 6 is a flowchart that illustrates the general logic that is performed in the application program 108 when the Sheet Set Manager is used to place callouts, according to the preferred embodiment of the present invention.

Block 600 represents the Sheet Set Manager accepting a user command that represents the user placing one or more callouts on the Sheets directly from the window 300, wherein the callouts indicate which Sheet or View to display for additional information. In this Block the Sheet Set Manager allows users to place callouts on the Sheets before a referenced Sheet or View has been defined. Moreover, the Sheet Set Manager allows users to create collections of callouts.

Block 602 represents the Sheet Set Manager automatically creating fields that display appropriate labels when the callouts are placed on the Sheets.

Block 604 represents the Sheet Set Manager automatically updating the callouts.

11.3 Views

Figure 7:
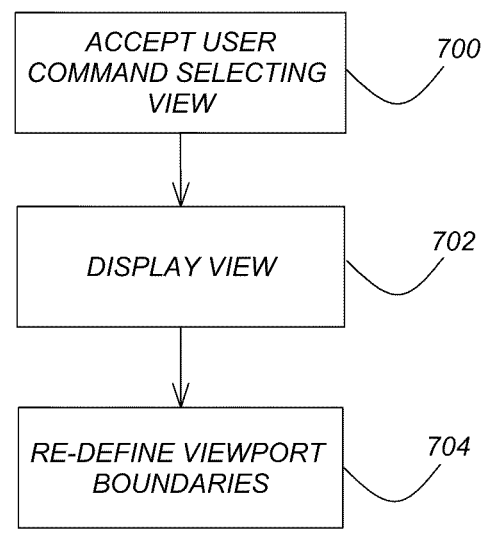
FIG. 7 is a flowchart that illustrates the general logic that is performed in the application program when the Sheet Set Manager is used to manage views, according to the preferred embodiment of the present invention.

FIG. 7 is a flowchart that illustrates the general logic that is performed in the application program 108 when the Sheet Set Manager is used to manage Views, according to the preferred embodiment of the present invention.

Block 700 represents the Sheet Set Manager accepting a user command that represents the user selecting one or more different Views from the window 300. Each of the Views is associated with a viewport. In addition, each of the Views may be represented by a thumbnail preview image displayed by the Sheet Set Manager.

Block 702 represents the Sheet Set Manager displaying selected Views.

Block 704 represents the Sheet Set Manager re-defining boundaries for the selected Views after creation.

11.4 Automatic View Creation

Figure 8:
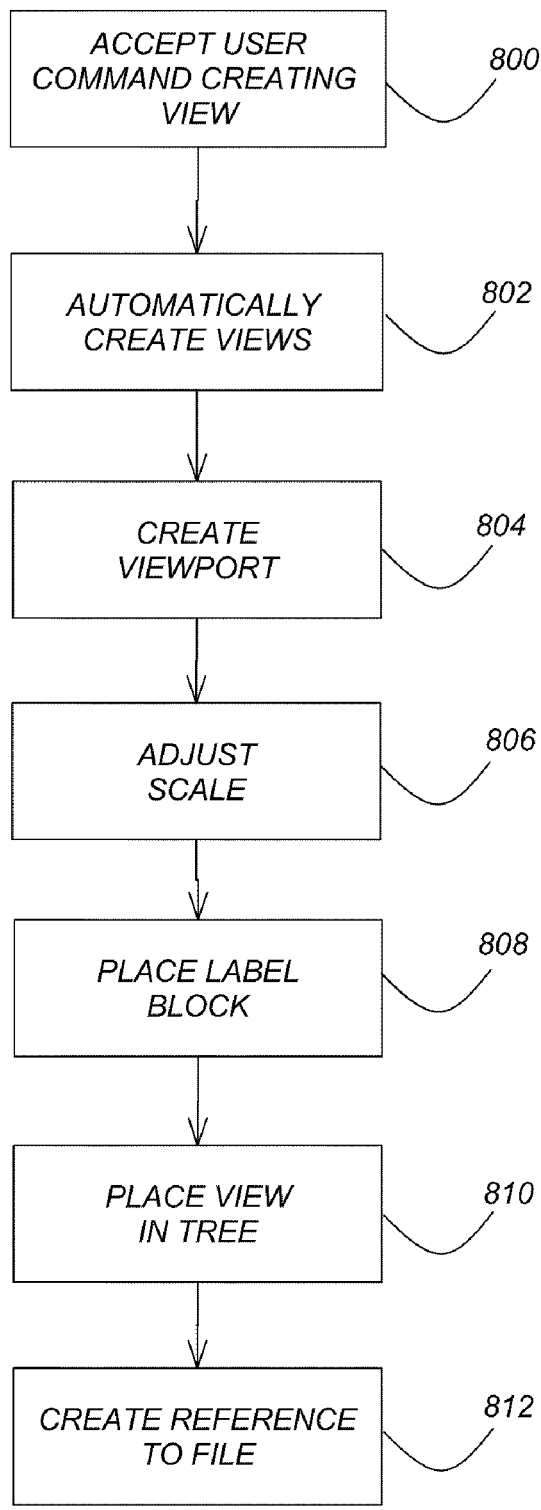
FIG. 8 is a flowchart that illustrates the general logic that is performed in the application program when the Sheet Set Manager is used to manage views, according to the preferred embodiment of the present invention.

FIG. 8 is a flowchart that illustrates the general logic that is performed in the application program 108 when the Sheet Set Manager is used to automatically create Views, according to the preferred embodiment of the present invention.

Block 800 represents the Sheet Set Manager accepting a user command that represents the user creating one or more different Views from the window 300. In one embodiment, the user command comprises a drag-and-drop operation.

Block 802 represents the Sheet Set Manager automatically creating one or more different Views for the Sheets in response to the user command.

Block 804 represents the Sheet Set Manager creating a viewport displaying a geometric region defined in the automatically created View.

Block 806 represents the Sheet Set Manager allowing the user to adjust a scale of the automatically created View.

Block 808 represents the Sheet Set Manager placing a label block associated with the automatically created View into the Sheet, with fields to display appropriate label information for the automatically created View, which updates automatically if their values change.

Block 810 represents the Sheet Set Manager placing the automatically created View in a hierarchical tree representation displayed on the computer 100.

Block 812 represents the Sheet Set Manager creating a reference to a file containing the automatically created View.

11.5 Sheet Set Publishing

Figure 9:
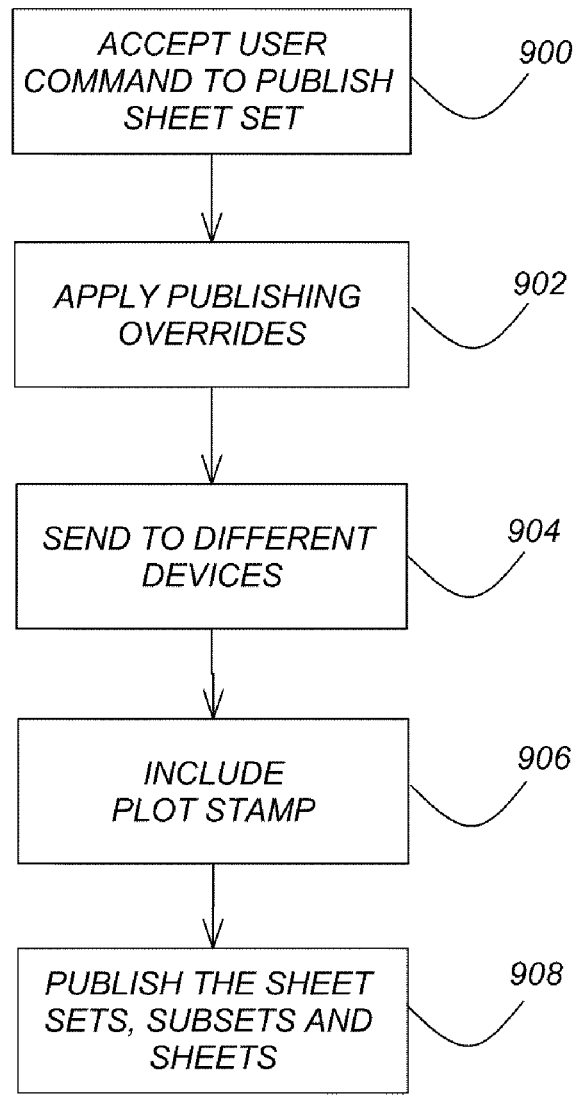
FIG. 9 is a flowchart that illustrates the general logic that is performed in the application program when the Sheet Set Manager is used to publish Sheet Sets, according to the preferred embodiment of the present invention.

FIG. 9 is a flowchart that illustrates the general logic that is performed in the application program 108 when the Sheet Set Manager is used to publish Sheet Sets, according to the preferred embodiment of the present invention.

Block 900 represents the Sheet Set Manager accepting a user command that represents the user instructing the Sheet Set Manager to publish the Sheet Set. In one embodiment, the user command comprises a "one-click" operation. For example, the user command may instruct the Sheet Set Manager to publish a selection of the Sheets within the Sheet Set using a single operation.

Block 902 represents the Sheet Set Manager optionally apply publishing overrides to the published Sheet Set, thereby changing a plurality of publishing properties for the Sheets contained therein.

Block 904 represents the Sheet Set Manager optionally allowing different elements of the published Sheet Set to be sent to different output devices.

Block 906 represents the Sheet Set Manager optionally including a plot stamp with each Sheet of the published Sheet Set.

Block 908 represents the Sheet Set Manager publishing the Sheet Set, Subsets and/or Sheets.

11.6 Transmittal and Archive

Figure 10:
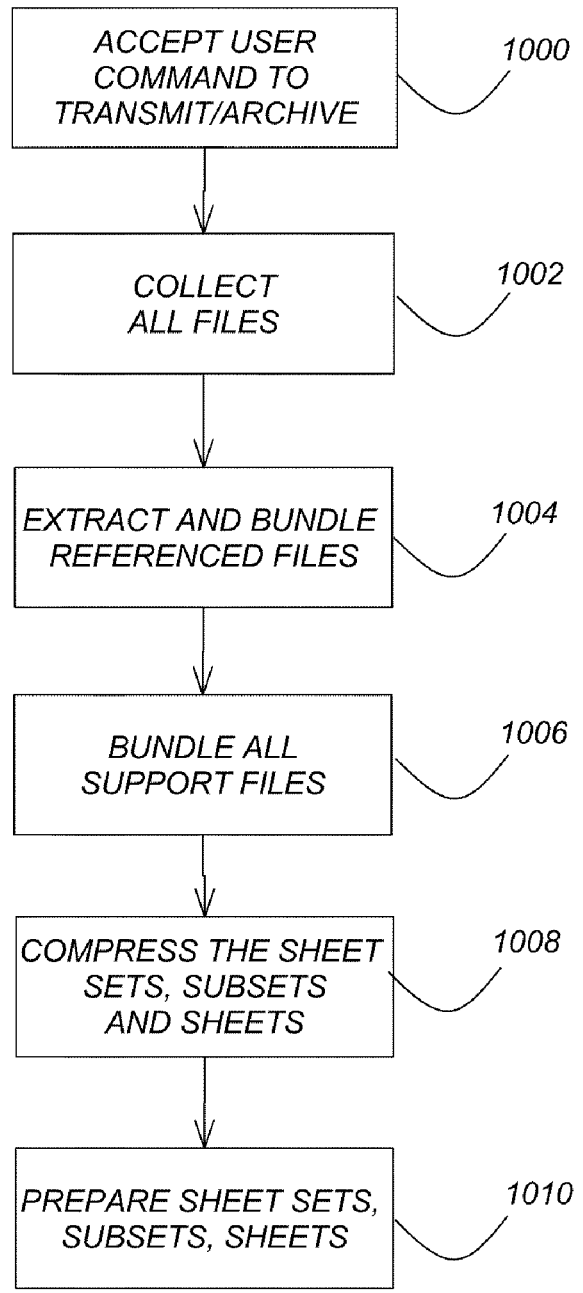
FIG. 10 is a flowchart that illustrates the general logic that is performed in the application program when the Sheet Set Manager includes a Transmittal and Archive function for packaging, communication and storage of the Sheet Set, Subsets and Sheets, and associated files, according to the preferred embodiment of the present invention.

FIG. 10 is a flowchart that illustrates the general logic that is performed in the application program 108 when the Sheet Set Manager includes a Transmittal and Archive function for packaging, communication and storage of the Sheet Set, Subsets and Sheets, and associated files, according to the preferred embodiment of the present invention.

Block 1000 represents the Sheet Set Manager accepting a user command that represents the user invoking the Transmittal and Archive function.

Block 1002 represents the Transmittal and Archive function collecting all files related to the Sheet Set, Subsets, and Sheets.

Block 1004 represents the Transmittal and Archive function automatically extracting and bundling all referenced files related to the Sheet Set, Subsets, and Sheets.

Block 1006 represents the Transmittal and Archive function automatically bundling all support files necessary to view and edit the Sheets.

Block 1008 represents the Transmittal and Archive function compressing the Sheet Set, Subsets, and Sheets.

Block 1010 represents the Transmittal and Archive function preparing the Sheet Set, Subsets, and Sheets to be saved, emailed, or otherwise transmitted.

12 CONCLUSION

This concludes the description of the preferred embodiment of the invention. The following describes some alternative embodiments for accomplishing the present invention.

For example, any type of computer could be used with the present invention. Moreover, any type of software could benefit from the present invention. Further, various visual representations could be used in place of those found in the preferred embodiment without departing from the scope of the present invention. Finally, different sequences of steps, commands or logic could be used in place of those found in the preferred embodiment without departing from the scope of the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for operating a graphics program in a computer, comprising:
 performing one or more functions of a Sheet Set Manager in the graphics program,
 (a) wherein the Sheet Set Manager manages one or more Sheet Sets, each of the Sheet Sets comprises a collection of zero or more Sheets and Subsets of the Sheets, each of the Sheets comprises a drawing, layout or view, and the Sheet Set Manager manages one or more different views for the Sheets; and
 (b) wherein the function comprises an Automatic View Creation, such that the Sheet Set Manager presents a user with a list of the views defined in the Sheet Set and the user places a view from the list onto a Sheet to invoke the Automatic View Creation.

2. The method of claim 1, wherein boundaries for the views are re-defined after creation.

3. The method of claim 1, wherein each of the views is associated with a viewport.

4. The method of claim 1, wherein each of the views is represented by a thumbnail preview image displayed by the Sheet Set Manager.

5. The method of claim 1, wherein the Sheet Set Manager automatically creates one or more different views for the Sheets in response to a user command.

6. The method of claim 5, wherein the user command comprises a drag-and-drop operation.

7. The method of claim 5, wherein the Sheet Set Manager creates a reference to a file containing the automatically created view.

8. The method of claim 5, wherein the Sheet Set Manager creates a viewport displaying a geometric region defined in the automatically created view.

9. The method of claim 5, wherein the automatically created view is placed in a hierarchical representation displayed on the computer.

10. The method of claim 5, wherein the Sheet Set Manager places a label block associated with the automatically created view into the Sheet, with fields to display label information for the automatically created view, which updates automatically if the field's values change.

11. The method of claim 5, wherein the Sheet Set Manager allows a user to adjust a scale of the automatically created view.

12. An apparatus for operating a graphics program in a computer, comprising:
a graphics program, executed by the computer, and performing one or more functions of a Sheet Set Manager in the graphics program,
(a) wherein the Sheet Set Manager manages one or more Sheet Sets, each of the Sheet Sets comprises a collection of zero or more Sheets and Subsets of the Sheets, each of the Sheets comprises a drawing, layout or view, and the Sheet Set Manager manages one or more different views for the Sheets; and
(b) wherein the function comprises an Automatic View Creation, such that the Sheet Set Manager presents a user with a list of the views defined in the Sheet Set and the user places a view from the list onto a Sheet to invoke the Automatic View Creation.

13. The apparatus of claim 12, wherein boundaries for the views are re-defined after creation.

14. The apparatus of claim 12, wherein each of the views is associated with a viewport.

15. The apparatus of claim 12, wherein each of the views is represented by a thumbnail preview image displayed by the Sheet Set Manager.

16. The apparatus of claim 12, wherein the Sheet Set Manager automatically creates one or more different views for the Sheets in response to a user command.

17. The apparatus of claim 16, wherein the user command comprises a drag-and-drop operation.

18. The apparatus of claim 16, wherein the Sheet Set Manager creates a reference to a file containing the automatically created view.

19. The apparatus of claim 16, wherein the Sheet Set Manager creates a viewport displaying a geometric region defined in the automatically created view.

20. The apparatus of claim 16, wherein the automatically created view is placed in a hierarchical representation displayed on the computer.

21. The apparatus of claim 16, wherein the Sheet Set Manager places a label block associated with the automatically created view into the Sheet, with fields to display label information for the automatically created view, which updates automatically if the field's values change.

22. The apparatus of claim 16, wherein the Sheet Set Manager allows a user to adjust a scale of the automatically created view.

23. An article of manufacture comprising a program storage device embodying instructions that, when executed by a computer, cause the computer to perform a method for operating a graphics program in a computer, comprising:
performing one or more functions of a Sheer Set Manager in the graphics program,
(a) wherein the Sheet Set Manager manages one or more Sheet Sets, each of the Sheet Sets comprises a collection of zero or more Sheets and Subsets of the Sheets, each of the Sheets comprises a drawing, layout or view, and the Sheer Set Manager manages one or more different views for the Sheets; and
(b) wherein the function comprises an Automatic View Creation, such that the Sheet Set Manager presents a user with a list of the views defined in the Sheet Set and the user places a view from the list onto a Sheet to invoke the Automatic View Creation.

24. The article of claim 23, wherein boundaries for the views are re-defined after creation.

25. The article of claim 23, wherein each of the views is associated with a viewport.

26. The article of claim 23, wherein each of the views is represented by a thumbnail preview image displayed by the Sheet Set Manager.

27. The article of claim 23, wherein the Sheet Set Manager automatically creates one or more different views for the Sheets in response to a user command.

28. The article of claim 27, wherein the user command comprises a drag-and-drop operation.

29. The article of claim 27, wherein the Sheet Set Manager creates a reference to a file containing the automatically created view.

30. The article of claim 27, wherein the Sheet Set Manager creates a viewport displaying a geometric region defined in the automatically created view.

31. The article of claim 27, wherein the automatically created view is placed in a hierarchical representation displayed on the computer.

32. The article of claim 27, wherein the Sheet Set Manager places a label block associated with the automatically created view into the Sheet, with fields to display label information for the automatically created view, which updates automatically if the field's values change.

33. The article of claim 27, wherein the Sheet Set Manager allows a user to adjust a scale of the automatically created view.

* * * * *